I. B. LIVINGSTON.
Underground-Telegraph Line.
No. 221,686. Patented Nov. 18, 1879.
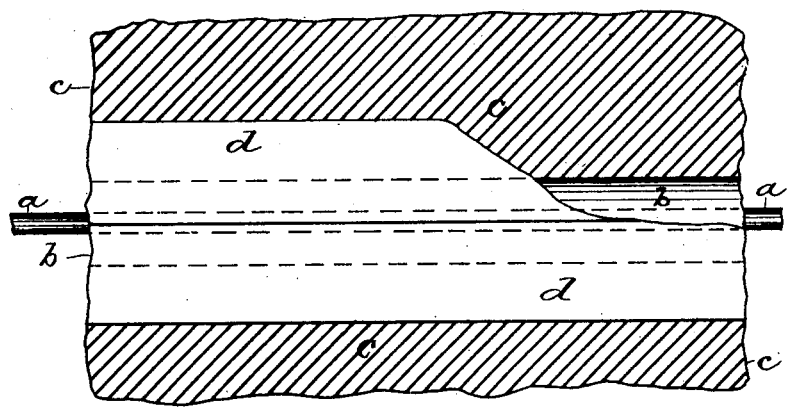

UNITED STATES PATENT OFFICE.

ISAAC B. LIVINGSTON, OF SPRINGFIELD, MASSACHUSETTS.

IMPROVEMENT IN UNDERGROUND-TELEGRAPH LINES.

Specification forming part of Letters Patent No. 221,686, dated November 18, 1879; application filed September 1, 1879.

*To all whom it may concern:*

Be it known that I, ISAAC B. LIVINGSTON, of Springfield, county of Hampden, and State of Massachusetts, have invented new and useful Improvements in the Construction of Underground-Telegraph Lines, which improvements are fully set forth in the annexed specification and in the accompanying drawing.

My invention consists in the peculiar manner of constructing an underground-telegraph line, as is fully described hereinafter, and specifically pointed out in the claims.

In the drawing is shown the conducting-wire $a$, the surrounding insulating material $b$, the body of hydraulic cement $d$, and the surrounding earth $c$.

The construction of underground-telegraph lines, as heretofore generally practiced, by laying pipes inclosing the wires insulated in different ways, or by inclosing the insulated wires in a wooden case in the ground, involves a heavy expense, necessitates the provision of some means for conveniently opening the said pipes or cases to get access to the conductors, thereby exposing the wires to the damaging effects of water which may penetrate such a tube or case, and other causes which operate to impair the conductivity of the wires.

My improved system of underground-telegraph construction, as herein set forth, obviates the above-named obstacles to the economical construction and convenient maintenance of underground lines, provides a novel and effectual means for insulating the wires, and such a construction as can be safely and easily broken into at any point on the line for the purposes of making branch connections or repairs and be easily restored to a good working condition.

I construct my underground-telegraph lines by digging a suitable trench, in the bottom of which I lay a bed of hydraulic cement. Upon this bed of cement I place a covering of brimstone (applied hot) of a sufficient width to lay a wire lengthwise thereon, and over the wire thus placed I pour melted brimstone, so as to solidly and tightly imbed the wire therein and render it impervious to dampness. Upon the top of the bed of cement, having thereon the wire protected by the brimstone, as above set forth, I place a thick covering of cement, causing the latter to be homogeneously united with the first-laid bed, so as to form substantially a solid cement line or trunk, inclosing within it a brimstone-surrounded wire or wires.

Having thus laid the conducting-wire in brimstone and cement, I fill up the trench, completing the construction of the line.

It is obvious that the wire in such an underground line as is above described need have but a few made connections therein, thus securing greater continuity.

The hydraulic cement and the brimstone constitute a perfect protection for the conducting-wire, and are comparatively inexpensive materials for this purpose.

Instead of the brimstone above named, asphalt, bitumen, or resin may be used, but not with so good results, for it is well known that the former is much the stronger material, a perfect insulator, and very cheap.

I am aware that asphalt and sulphur have been heretofore known as insulating material for telegraph-wires, and I do not broadly claim the use of these materials; but

What I claim is—

1. The herein-described mode of laying underground-telegraph lines, consisting in, first, laying in a suitable trench dug in the earth a bed of hydraulic cement, in placing upon this bed a covering of brimstone adapted to receive the wire and placing the wire thereon, next in covering said wire with brimstone, and, lastly, in covering the whole with the hydraulic cement, causing the same to unite homogeneously with the bed, all as and for the purposes set forth.

2. An underground-telegraph line consisting of a hydraulic-cement bed, of a sulphur-insulating bed, and covering surrounding the wire and placed upon the cement bed, and a covering of hydraulic cement united homogeneously to the cement bed, as and for the purpose set forth.

ISAAC B. LIVINGSTON.

In presence of—
WM. H. CHAPIN,
J. F. HITCHCOCK.